United States Patent [19]

Ito

[11] Patent Number: 5,221,985

[45] Date of Patent: Jun. 22, 1993

[54] OPTICAL COMMUNICATION SYSTEM

[75] Inventor: Yujiro Ito, Kanagawa, Japan

[73] Assignee: Sony Corporation, Tokyo, Japan

[21] Appl. No.: 783,540

[22] Filed: Oct. 28, 1991

[30] Foreign Application Priority Data

Oct. 30, 1990 [JP] Japan .................................. 2-292934
Oct. 30, 1990 [JP] Japan .................................. 2-292937

[51] Int. Cl.$^5$ .............................................. H04B 10/00
[52] U.S. Cl. .................................... 359/154; 359/113;
359/170; 250/203.3
[58] Field of Search ............... 359/154, 152, 156, 169,
359/170, 143, 113, 159; 356/153, 152;
250/203.3

[56] References Cited

U.S. PATENT DOCUMENTS

| 3,504,182 | 3/1970 | Pizzurro et al. | 359/171 |
|---|---|---|---|
| 3,511,998 | 5/1970 | Smokler | 359/114 |
| 3,566,126 | 2/1971 | Lang et al. | 359/170 |
| 3,828,185 | 8/1974 | Vandling | 359/170 |
| 4,696,062 | 9/1987 | LaBudde | 359/159 |
| 4,867,560 | 9/1989 | Kunitsugu | 356/152 |
| 5,060,304 | 10/1991 | Solinsky | 359/152 |
| 5,065,455 | 11/1991 | Ito et al. | 359/159 |

FOREIGN PATENT DOCUMENTS 1234997 7/1971 United Kingdom .

OTHER PUBLICATIONS

W. Auer, "Pointing Acquisition and Tracking for Inter-satellite Optical Data Links", Proc. ESA Workshop on Space Laser Applications and Technology, Les Diablerets, 26–30 Mar. 1984.

Primary Examiner—Edward L. Coles, Sr.
Assistant Examiner—Kinfe-Michael Negash
Attorney, Agent, or Firm—Philip M. Shaw, Jr.

[57] ABSTRACT

An optical communication system which does not require a re-adjusting operation of an irradiating direction of a light beam and is improved in convenience in use. The optical communication system includes first and second terminals remotely located from each other for transmitting therebetween a light beam carrying an information signal therein. A first light beam having a predetermined direction of polarization is generated in the first terminal and transmitted to the second terminal by way of an optical system while a second light beam having a different direction of polarization comes from the second terminal and is received by way of the optical system. A beam selector passes one of the first and second light beams and reflects the other light beam. An electric signal is generated in response to the received second light beam, and the direction of the first light beam is controlled in response to such electric signal. Such controlling operation is interrupted when the electric signal has a voltage level lower than a predetermined voltage level.

16 Claims, 14 Drawing Sheets

OPTICAL COMMUNICATION SYSTEM

BACKGROUND OF THE INVENTION

1. Field of the Invention

This invention relates to an optical communication system by which desired information is transmitted by way of a light beam which propagates in a space.

2. Description of the Prior Art

An optical communication system is conventionally known and disclosed, for example, in Japanese Patent Laid-Open Application No. 2-276328 and also in Japanese Patent Laid-Open Application No. 1-30573 wherein part of a beam of light having a predetermined polarization plane and sent out toward an object for transmission is turned back and measured together with light for measurement coming from the object for transmission so that the irradiating position of such beam of light can be confirmed readily.

An exemplary one of such conventional optical communication systems is shown in FIG. 19. Referring to FIG. 19, a conventional optical communication system shown is generally denoted at 1 and includes a laser diode 2 which is driven in accordance with a predetermined information signal to emit therefrom a light beam LA1 having a predetermined polarization plane.

The light beam LA1 is converted into a parallel light beam by a lens 4, passes through a polarizing prism 6 and is introduced to a half mirror 8.

The half mirror 8 passes part of the light beam LA1 therethrough, and such passing light is sent out toward an object for transmission by way of a pair of lenses 16 and 18.

In this manner, the optical communication system 1 sends out a light beam LA1 having a predetermined polarization plane toward an object for transmission.

Meanwhile, the half mirror 8 reflects the remaining part of the light beam LA1 from the polarizing prism 6 toward a corner cube prism 10 and passes and introduces turned back light reflected from the corner cube prism 10 to an image pickup element 14 by way of a lens 12.

In this manner, the optical communication system 1 separates part of a light beam LA1 to be sent out toward an object for transmission and turns back the optical path of the separated light so that the separated light may be focused upon the image pickup element 14.

On the other hand, the lens 18 receives a light beam LA2 coming from the object for transmission and introduces it to the polarizing prism 6 by way of the lens 16 and the half mirror 8. Here, the object for transmission is constructed such that it emits a light beam having a polarization plane perpendicular to the polarization plane of the light beam LA1.

The optical communication system 1 thus reflects the light beam LA2 by means of the polarizing prism 6 and then focuses the light beam LA2 upon a light receiving element 22 by means of a lens 20.

In this manner, the optical communication system 1 is constructed such that it receives a light beam LA2 coming from an object for transmission thereby to receive information carried on the light beam LA2.

The lens 18 also receives, together with such light beam LA2, light (which will be hereinafter referred to as observation light) L1 which advances from the background of the object for transmission toward the optical communication system 1. The thus received observation light L1 is introduced to the image pickup element 14 by way of the lens 16, half mirror 8 and lens 12.

Consequently, a component of the observation light L1 parallel to an optical axis of the light beam LA1 is introduced into the lens 12 in parallel to the reflected light from the corner cube prism 10. Accordingly, the reflected light from the corner cube prism 10 enters the lens 12 along such optical path that it seems as if it is emitted from an irradiating position of the light beam LA1 toward the optical communication system 1.

Consequently, with the optical communication system 1, a pickup picture image forming a bright spot can be obtained at the irradiating position of the light beam LA1 on the image pickup element 14, and accordingly, the irradiating position of the light beam LA1 can be confirmed readily.

By the way, it is considered convenient if such optical communication system 1 can be reduced in size. In particular, the optical communication system 1 can be installed by a simple operation because the irradiating position of the light beam LA1 can be detected readily. Accordingly, the optical communication system 1 can be installed at a desired location and utilized, for example, for relaying of television broadcasting or the like in accordance with the necessity. However, in such an instance, the irradiating position of the light beam LA1 may possibly be displaced by vibrations or the like of the optical communication system 1.

One of possible solutions to this problem is to correct, using, for example, a servo technique, the irradiating position of the light beam LA1 with reference to the light beam LA2 coming from the object for transmission. However, the solution has a problem that, where the transmission distance is great, it is difficult to correct the irradiating position of such light beam LA1 with a high degree of accuracy due to an influence of reflected light reflected in the inside of the optical communication system 1.

Further, the solution has another drawback that, when a fog or the like gathers or sunlight or the like is inadvertently admitted into the optical communication system, the light beam LA1 is sometimes irradiated in a direction quite different from the direction toward an object for transmission, and after the fog lifts or when the sunlight is no more admitted into the optical communication system, the irradiating direction of the light beam LA1 must be re-adjusted so that servoing may be rendered effective.

In particular, if a fog gathers, then the intensity of the light beam LA2 is decreased extremely, and consequently, the output signal level of a light receiving element for detecting such light beam LA2 drops. Consequently, the SN ratio of the output signal is deteriorated, and the light beam LA1 may be irradiated in error in a direction quite different from the direction toward the object for transmission. On the other hand, when sunlight is admitted into the optical communication system, the irradiating position of the light beam LA1 will be corrected to the direction of the sun in error.

SUMMARY OF THE INVENTION

It is an object of the present invention to provide an optical communication system which can irradiate a light beam with certainty upon an object for transmission.

It is another object of the present invention to provide an optical communication system which does not require a re-adjusting operation of an irradiating direction of a light beam and is improved in convenience in use.

In order to attain the objects, according to an aspect of the present invention, there is provided an optical communication system having first and second terminals remotely located from each other for transmitting therebetween a light beam carrying an information signal therein, the first terminal comprising means for generating a first light beam having a predetermined direction of polarization, a beam selector for passing one of the first light beam and a second light beam coming from the second terminal therethrough and reflecting the other light beam, the second light beam having a different direction of polarization from that of the first light beam, optical means for transmitting the first light beam to the second terminal and for receiving the second light beam from the second terminal, means for generating an electric signal in response to the second light beam, beam steering means for controlling the direction of the first light beam in response to the electric signal, and means for interrupting operation of the beam steering means when the electric signal has a voltage level lower than a predetermined voltage level.

According to another aspect of the present invention, there is provided an optical communication system having first and second terminals remotely located from each other for transmitting therebetween a light beam carrying an information signal therein, the first terminal comprising means for generating a first light beam having a predetermined direction of polarization, a beam selector for passing one of the first light beam and a second light beam coming from the second terminal and reflecting the other light beam, the second light beam having a different direction of polarization from that of the first light beam, optical means for transmitting the first light beam to the second terminal and for receiving the second light beam from the second terminal, means for separating the second light beam into two beams which advance in different directions, a filter disposed on a path of one of the two beams for passing only a light beam having a predetermined frequency, sensing means including a first sensor for sensing an output light beam of the filter and a second sensor for sensing the other of the two beams from the separating means, beam steering means for controlling the direction of the first light beam in response to output signals of the sensing means, and means for interrupting an operation of the beam steering means in accordance with a ratio between voltage levels of output signals of the first and second sensors.

According to a further aspect of the present invention, there is provided an optical communication system having first and second terminals remotely located from each other for transmitting therebetween a light beam carrying an information signal therein, the first terminal comprising means for generating a first light beam having a predetermined direction of polarization, optical means for transmitting the first light beam to the second terminal and for receiving a second light beam having a different direction of polarization from that of the first light beam, means for detecting a difference between positions of the first and second light beams, beam steering means for controlling the direction of the first light beam in response to an output signal of the detecting means, means for generating an offset voltage in a condition wherein the second light beam is not received by the first terminal, and means for supplying the offset voltage to the output signal of the detecting means.

With the optical communication system of the invention, since a result of detection of a displacement of a transmission light beam is corrected in accordance with a result of detection performed in a condition wherein no reception light beam is received, a result of detection of a displacement can be obtained with a high degree of accuracy. Then, the irradiating position of the transmission light beam is corrected in accordance with such result of detection of a displacement, and consequently, the light beam can be irradiated with certainty upon the object for transmission or second terminal.

The above and other objects, features and advantages of the present invention will become apparent from the following description and the appended claims, taken in conjunction with the accompanying drawings in which like parts or elements are denoted by like reference characters.

BACKGROUND OF THE INVENTION

Figure 12:
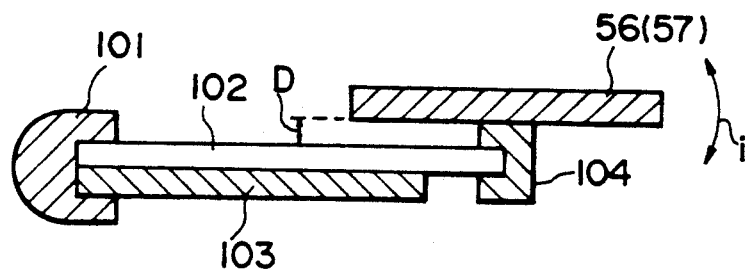
FIG. 12 is an enlarged sectional view illustrating a manner in which the mirror of FIG. 11 is supported.
Figure 11:
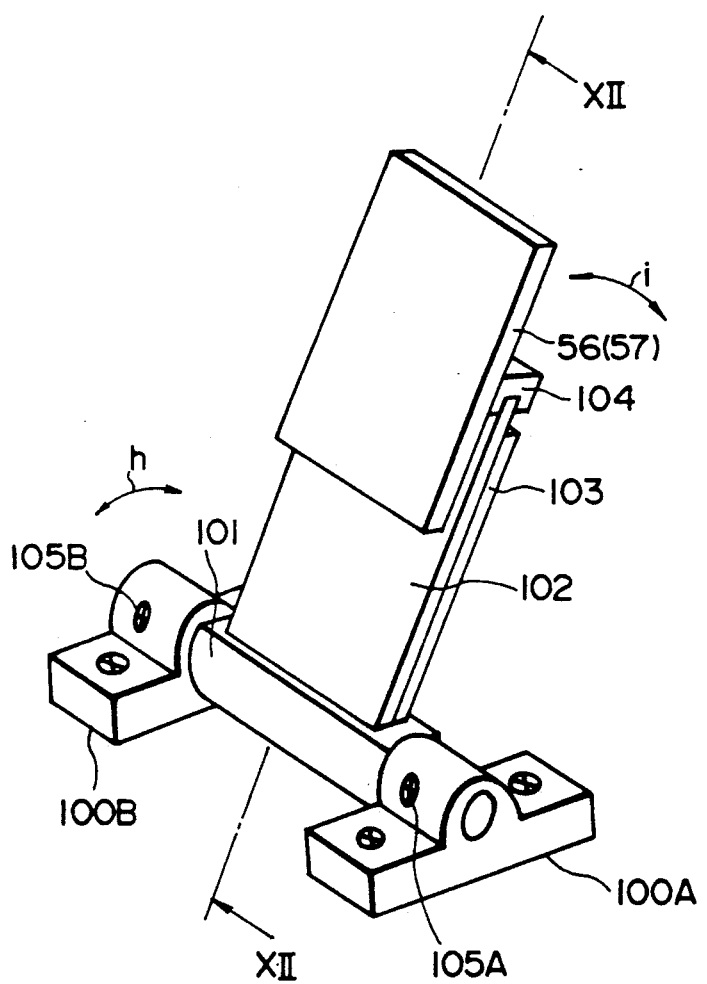
FIG. 11 is a perspective view showing a mirror of the transmission optical system of FIG. 2.
Figure 13:
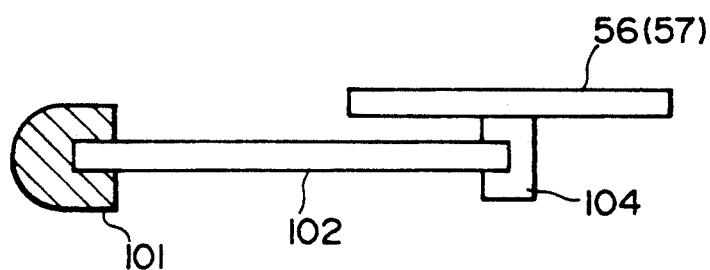
FIG. 13 is a sectional view illustrating a possible manner in which a mirror is supported.
Figure 15:
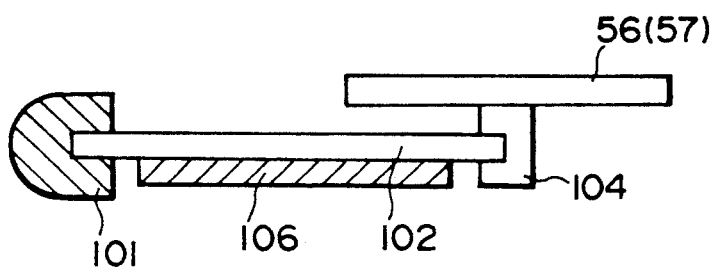
Figure 18:
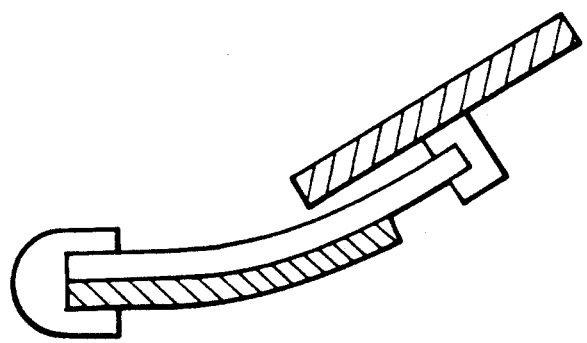
Figure 14A:
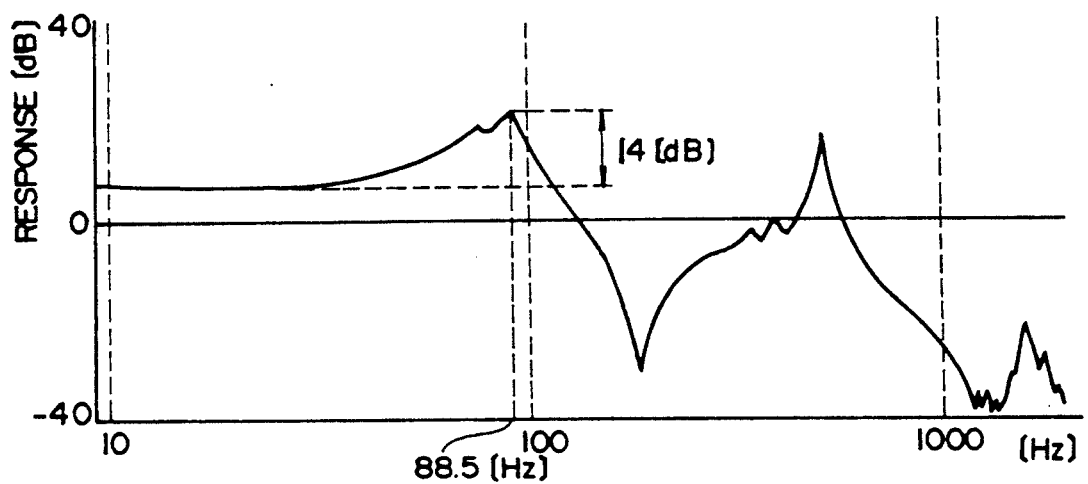
Figure 14B:
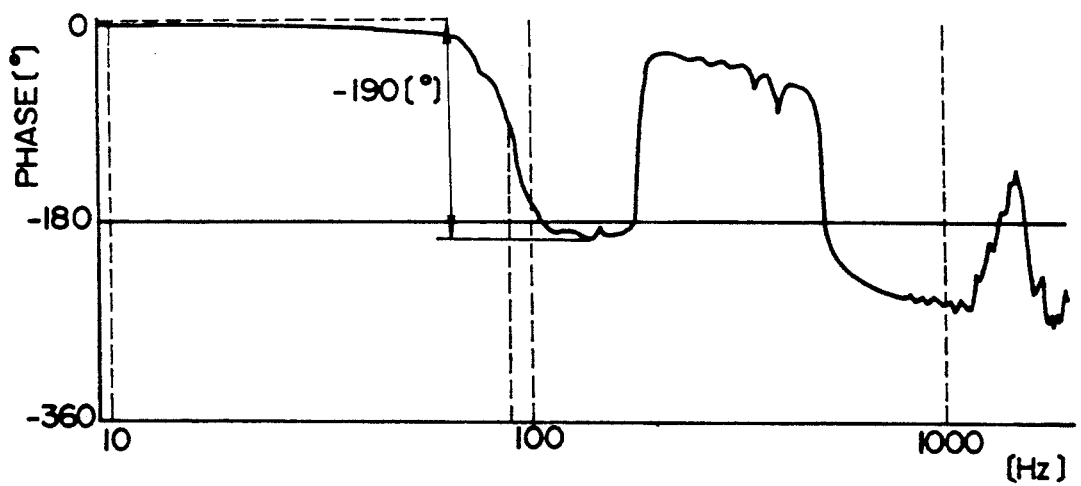
Figure 16A:
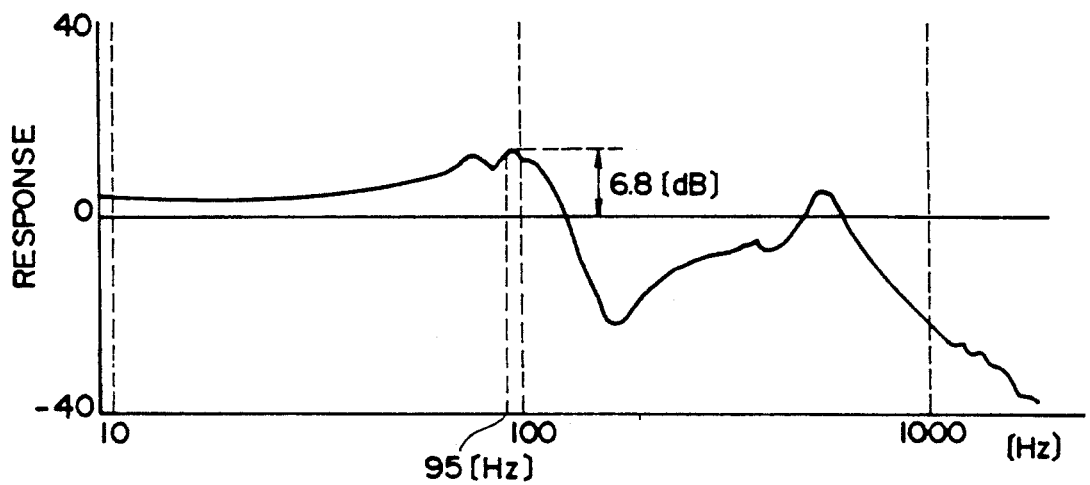
Figure 16B:
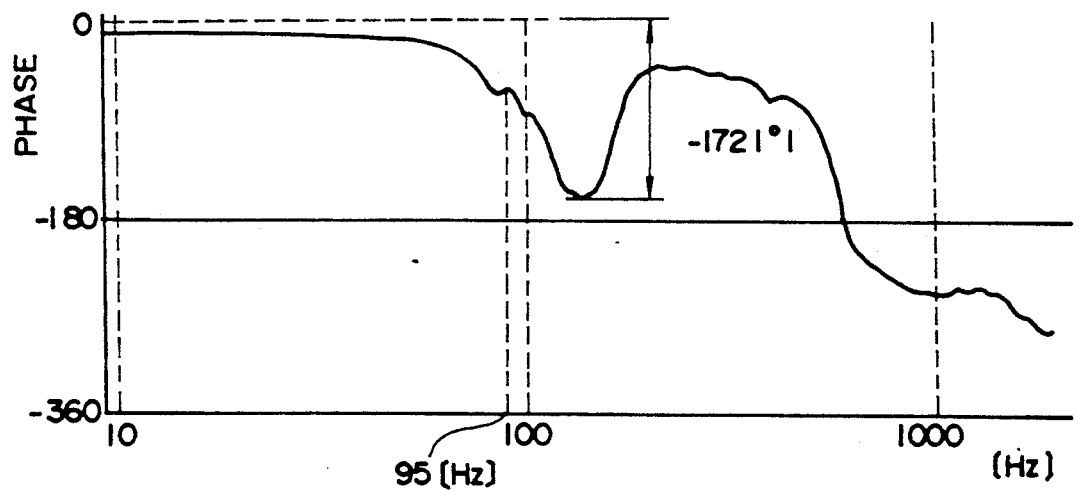
Figure 17A:
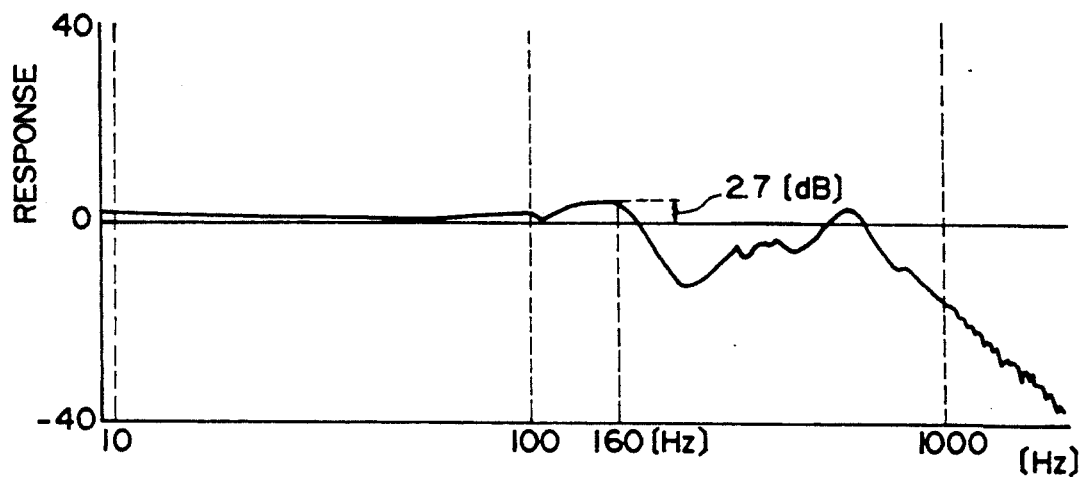
Figure 17B:
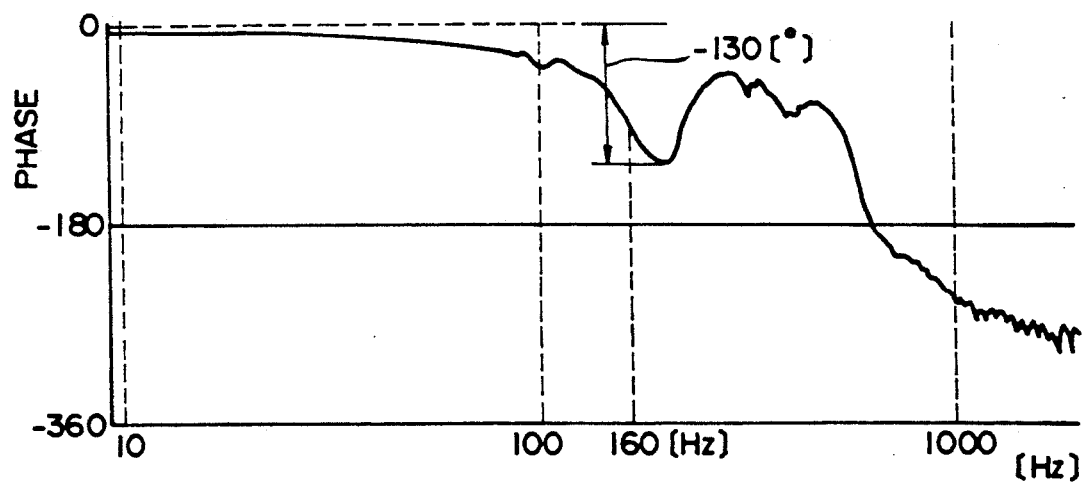
Figure 19:
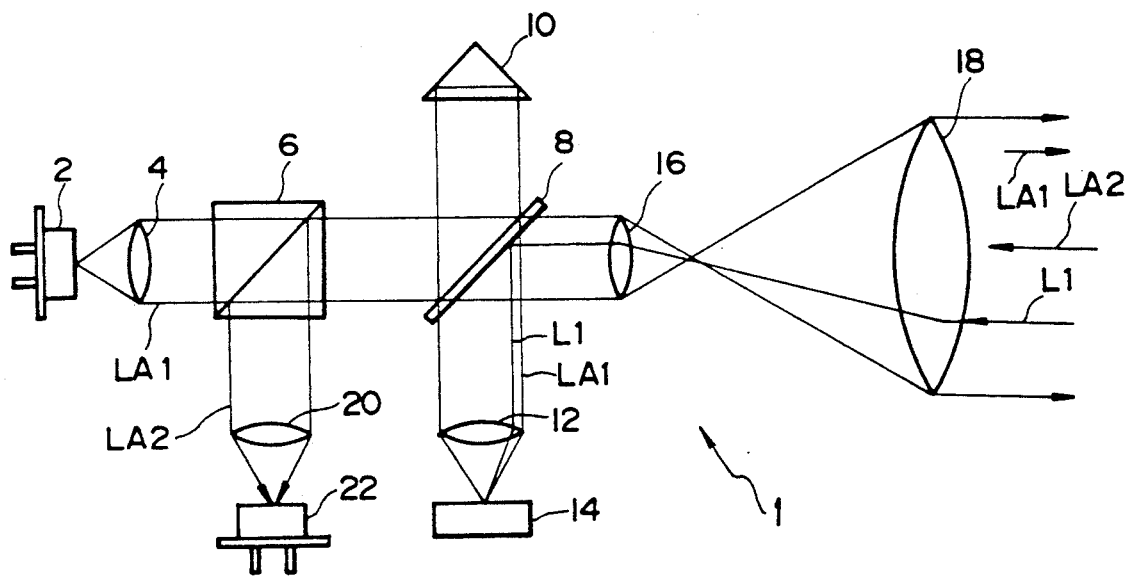

FIGS. 14(A) and 14(B) are graphs illustrating frequency characteristics of the mirror supported in the manner shown in FIG. 13;

FIG. 15 is a sectional view illustrating another possible manner in which a mirror is supported;

FIGS. 16(A) and 16(B) are graphs illustrating frequency characteristics of the mirror supported in the manner shown in FIG. 15;

FIGS. 17(A) and 17(B) are graphs illustrating frequency characteristics of the mirror supported in the manner illustrated in FIG. 12;

FIG. 18 is a side sectional view of the mirror of FIG. 11 illustrating the mirror displaced by way of a bimorph plate; and FIG. 19 is a diagrammatic representation showing a conventional optical communication system.

DETAILED DESCRIPTION OF THE PREFERRED EMBODIMENT

Figure 1:
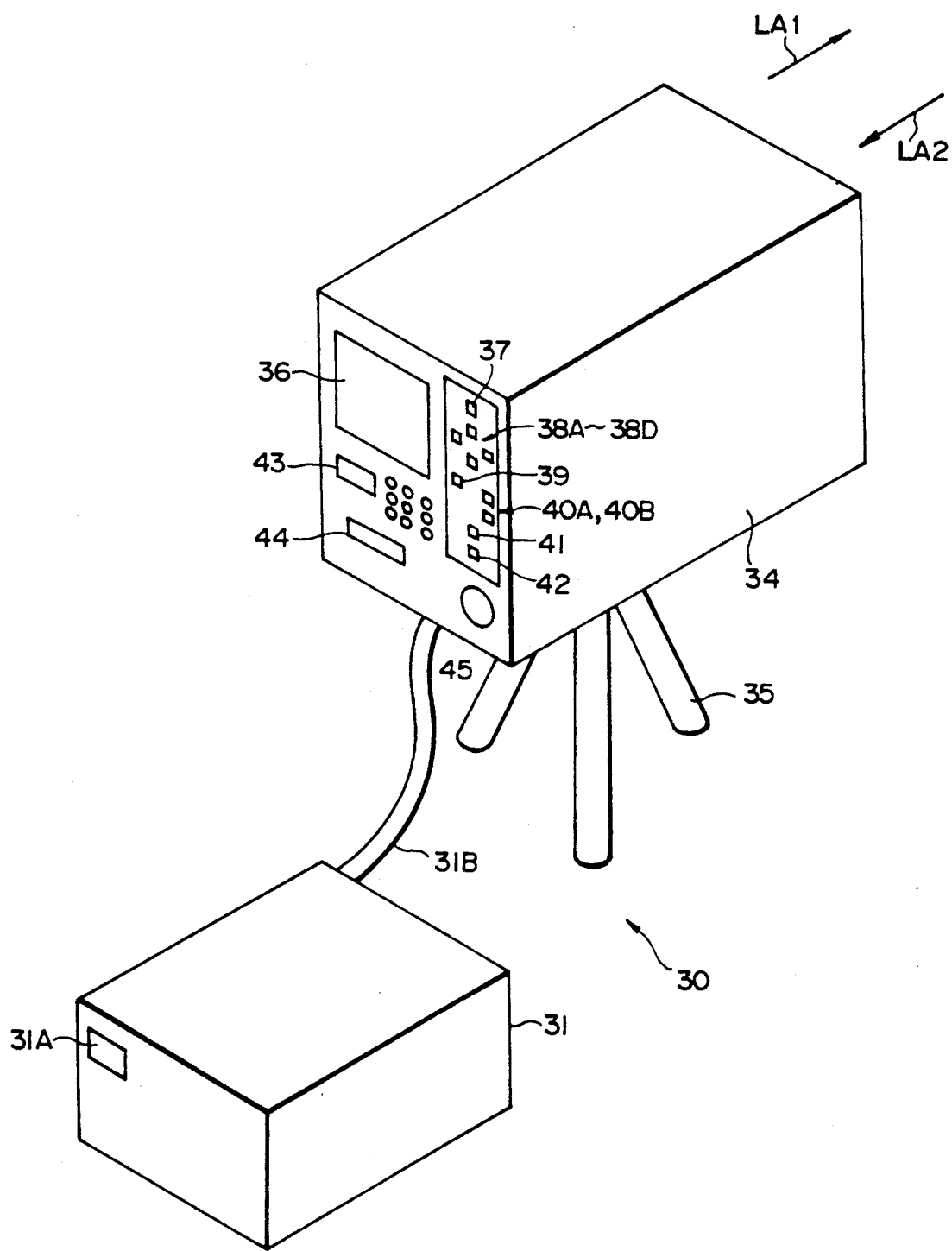
FIG. 1 is a perspective view of an optical communication system showing a preferred embodiment of the present invention.

Referring first to FIG. 1, there is shown an optical communication system to which the present invention is applied. The optical communication system is generally denoted at 30 and includes an optical communication system body 34 serving as a terminal and a power source apparatus 31 for driving the optical communication system body 34.

Though not shown, a battery is accommodated in the power source apparatus 31, and when a power source switch 31A provided on a front face of the power source apparatus 31 is operated into an on state, power of the battery is supplied to the optical communication system body 34 by way of a cable 31B. Consequently, the optical communication system 34 is placed into an operative condition in response to such operation of the power source switch 31A provided on the power source apparatus 31. Accordingly, with the optical communication system 30, the battery can be replaced readily on the power source apparatus 31 side.

The optical communication system body 34 is carried on a stand 35 so that it may be installed at a predetermined position, and is constructed such that an irradiating position of a light beam LA1 emitted from the optical communication system body 34 can be confirmed by way of a display screen 36 provided on an operation panel 34A of the optical communication system body 34 in accordance with the necessity.

The optical communication system body 34 has an initializing switch 37 at an upper location of the operation panel 34A thereof. When the initializing switch 37 is operated into an on state, an irradiating position adjusting mechanism for the light beam LA1, which will be hereinafter described, is re-set to the center of operation.

The optical communication system 34 further includes four operating elements 38A to 38D for adjustment of an irradiating position on the operation panel 34A below the initializing switch 37. When one of the operating elements 38A to 38D is operated into an on state, the irradiating position of the light beam LA1 is adjusted in a corresponding one of the upward, downward, leftward and rightward directions.

If a servo switch 39 is operated into an on state after the irradiating position of the light beam LA1 has been adjusted, then the irradiating position of the light beam LA1 is corrected with reference to a light beam LA2 coming thereto from an object for transmission serving as a second terminal, and such corrected condition can be confirmed by visual observation of a pair of light emitting elements 40A and 40B which are lit when such correction is completed.

A monitor switch 41 and a zooming operating element 42 are disposed on the operation panel 34A below the servo switch 39. When the monitor switch 41 or the zooming operating element 42 is operated into an on state, the display screen 36 is changed over into an on state and the magnification of a display image on the display screen 36 is varied.

A monitoring indicator 43 is disposed below the display screen 36 on the operation panel 34A such that the light intensity of a light beam LA2 coming from an object for transmission can be monitored from a pointer of the monitoring indicator 43.

A pair of connectors 44 and 45 are disposed at lower locations of the operation panel 34A so that a received video signal and a communicating signal can be outputted to the outside.

Figure 2:
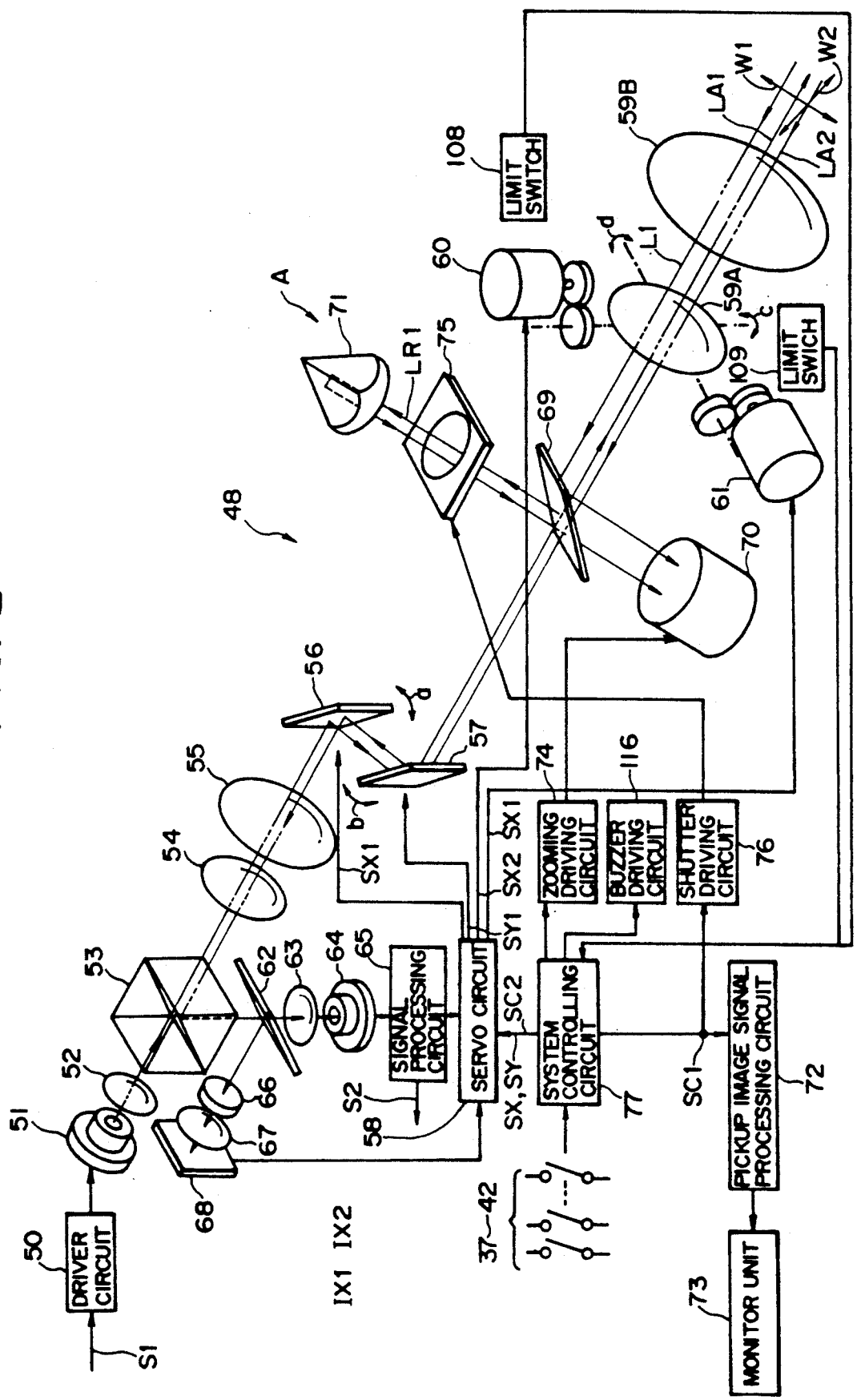
FIG. 2 is a diagrammatic representation showing a transmission optical system of the optical communication system of FIG. 1.

Referring now to FIG. 2, the optical communication system body 34 includes a transmission optical system 48 accommodated in a rectangular casing 80 thereof shown in FIG. 1 and sends out and receives light beams LA1 and LA2 to and from an object for transmission, respectively, by way of the transmission optical system 48.

In particular, a driver circuit 50 drives a laser diode 51 in response to a desired information signal S1 to be transmitted. The laser diode 51 is held at a predetermined inclination with respect to the casing 80 of the optical communication system body 34 so that it emits a light beam LA1 having a polarization plane W1 which is inclined by an angle of about 45 degrees with respect to a horizontal axis of the optical communication system body 34.

A lens 52 converts the light beam LA1 emitted from the laser diode 51 into a parallel beam of light, which passes through a polarizing prism 53 and is introduced to a mirror 56 by way of a pair of lenses 54 and 55. Here, the mirror 56 is disposed in an inclined relationship by 45 degrees with respect to an optical axis of the light beam LA1 so that the optical axis of the light beam LA1 may be bent by about 90 degrees in a horizontal direction.

Another mirror 57 is disposed on the optical axis of the thus bent optical light beam LA1 similarly in an inclined relationship by 45 degrees with respect to the optical axis of the light beam LA1 so that the optical axis of the light beam LA1 bent by the mirror 56 is bent again so as to be parallel to the optical axis of the light beam LA1 incident to the mirror 56.

In this instance, the mirrors 56 and 57 are pivoted by small angles in horizontal and vertical directions as indicated by arrow marks a and b in response to driving signals SX1 and SY1, respectively, outputted from a servo circuit 58. Consequently, the mirrors 56 and 57 displace the optical axis of the light beam LA1 by small angles in the upward or downward and leftward or rightward directions, respectively, thereby to finely correct the irradiating direction of the light beam LA1 to be irradiated from the optical communication system body 34.

A lens 59A focuses the light beam LA1 reflected from the mirror 57 and sends out the same toward the object for transmission by way of another lens 59B. The light beam LA1 is thus sent out with a predetermined spread toward the object for transmission.

In this instance, the lens 59A is driven to be moved in an upward or downward direction and a leftward or rightward direction as indicated by arrow marks c and d by a pair of motors 60 and 61, respectively, and thus, the irradiating direction of the light beam LA1 is adjusted roughly in accordance with driving signals SX2 and SY2 outputted from the servo circuit 58.

In this manner, with the optical communication system body 34, the mirrors 56 and 57 and the lens 59A are moved so that, even if the optical communication system body 34 is vibrated by a wind or the like, it can irradiate the light beam LA1 with certainty upon the object for transmission.

On the other hand, a light beam LA2 coming from the object for transmission is received by the lens 59B and advances in the opposite direction along the optical path of the light beam LA1 so that it is introduced to the polarizing prism 53. Here, the light beam LA2 is emitted from the object for transmission such that the polarization plane W2 thereof may be perpendicular to the polarization plane W1 of the light beam LA1. The light beam LA2 introduced to the polarizing prism 53 is reflected in and by the same so that it is introduced into a half mirror 62. The half mirror 62 reflects part of the light beam LA2 from the polarizing prism 53 so that the light beam LA2 may be subsequently condensed by a lens 63 and introduced to a light receiving element 64.

The light receiving element 64 produces an output signal corresponding to the light beam LA2 thus received, and the output signal of the light receiving element 64 is demodulated by a signal processing circuit 65. In this manner, the optical communication system body 34 receives an information signal S2 involved in the light beam LA2 sent out from the object for transmission.

Meanwhile, the half mirror 62 reflects the remaining part of the received light beam LA2. The thus reflected light beam LA2 is focused upon a light receiving face of a position detecting sensor 68 by a condenser lens 67. Here, the position detecting sensor 68 is formed from a two-dimensional position detecting sensor which develops four output signals IX1, IX2, IY1 and IY2 in accordance with a position of a light spot formed on the light receiving face thereof. Thus, with the optical communication system body 34, an irradiating position of the light beam LA2 relative thereto can be detected with a high degree of accuracy in accordance with such output signals IX1 to IY2 of the position detecting sensor 68.

In particular, the servo circuit 58 executes adding, subtracting and dividing processing of the output signals IX1 to IY2 to produce error signals and outputs driving signals SX1 to SY2 in accordance with such error signals.

The servo circuit 58 thus corrects the irradiating position of the light beam LA1 with reference to the light beam LA2 so that, even if the optical communication system body 34 is vibrated by a wind or the like, the light beam LA1 can be irradiated with certainty upon the object for transmission.

A collimate scope A is disposed on the optical path between the mirror 57 and the lens 59A so that the irradiating position of the light beam LA1 can be confirmed by visual observation on the display screen 36.

The collimate scope A includes a half mirror 69 disposed on the optical path of the light beam LA1 for reflecting part of the light beam LA1. Simultaneously, the half mirror 69 receives, by way of the lenses 59B and 59A, observation light L1 which advances from the background of the object for transmission toward the optical communication system 30 and reflects the observation light L1 in a direction opposite to a direction in which the optical beam LA1 is reflected by the half mirror 69 so that the observation light L1 may be introduced into an image pickup optical system 70.

A corner cube prism 71 of the image pickup optical system 70 receives reflected light LR1 of the light beam LA1 from the half mirror 69 and turns back the optical path of the reflected light LR1 in parallel so that the reflected light LR1 may be introduced to the image pickup optical system 70 by way of the half mirror 69.

The image pickup optical system 70 focuses the received reflected light LR1 and observation light L1 upon an image pickup element (not shown) built therein and delivers an output signal of the image pickup element to a pickup image signal processing circuit 72.

The pickup image signal processing circuit 72 converts such output signal of the image pickup element into a video signal and outputs the video signal to a monitor unit 73 so that the irradiating position of the light beam LA1 can be visually observed as a bright spot on the background of the landscape around the object for transmission on the display screen 36 on the operation panel 34A of the optical communication system body 34.

The image pickup optical system 70 is connected to be driven by a zooming driving circuit 74 so as to vary the magnification thereof.

Thus, with the optical communication system body 34, the irradiating position of the light beam LA1 can be adjusted readily by adjusting the irradiating position of the light beam LA1 roughly at a low magnification and adjusting the irradiating position at successively increasing magnifications and then causing the servo circuit 58 to operate within a predetermined range.

A shutter 75 is interposed between the corner cube prism 71 and the half mirror 69. Thus, upon communication, the shutter 75 may be closed, in accordance with the necessity, so that the light beam LA1 may not be returned to the light receiving element 64.

The shutter 75 is connected to be driven by a shutter driving circuit 76 and is changed over between a light intercepting condition an an open condition in an interlocking relationship with the pickup image signal processing circuit 72.

Thus, when the monitor switch 41 is operated into an on state, the optical communication system body 34 forms a display picture image on the display screen 36 in accordance with a controlling signal SC1 outputted from a system controlling circuit 77 so that the irradiating position of the light beam LA1 can be confirmed on the display screen 36.

Accordingly, if the irradiating position of the light beam LA1 is adjusted and then the monitor switch 41 is changed over into an off state, then the optical path of the light beam LA1 reflected by the half mirror 69 is intercepted. When the shutter 71 is closed, the optical path of the light beam LA1 reflected from the half mirror 69 which is turned back by the corner cube prism 71 and then introduced to the light receiving element 64 by way of the half mirror 69, mirrors 57 and 56, lenses 55 and 54, polarizing prism 53, half mirror 62 and lens 63 is intercepted.

Consequently, production of a stroke can be reduced as much and information can be received with certainty.

Further, in this instance, the light beam LA1 is prevented from returning to the laser diode 51, and consequently, the light beam LA1 can be irradiated stably as much.

Figure 3:
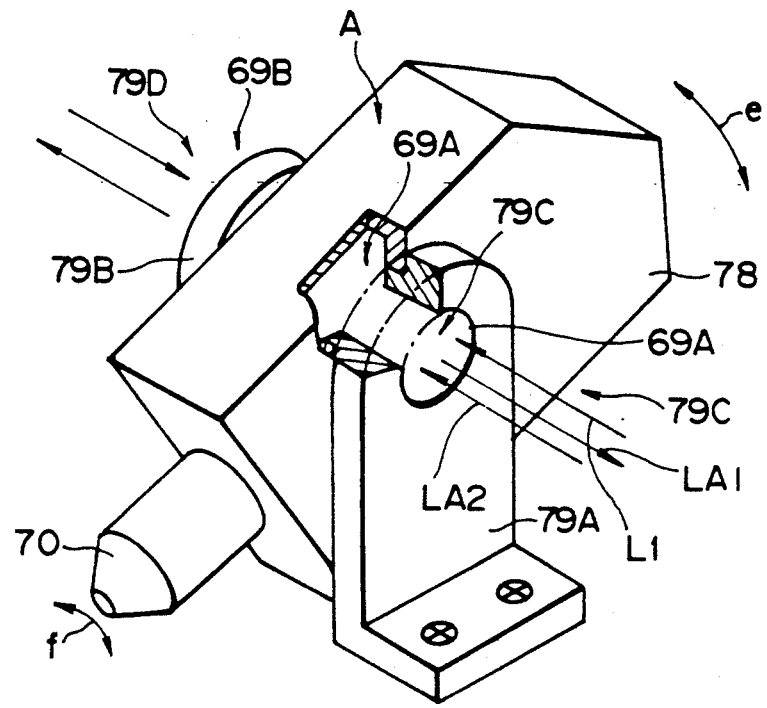
FIG. 3 is a perspective view showing a collimate scope of the transmission optical system of FIG. 2.

Referring now to FIG. 3, the collimate scope A is accommodated in a predetermined housing 78 such that it may be pivoted as indicated by a double-sided arrow mark e around an optical axis of the lens 59B. The housing 78 has a pair of windows 69A and 69B formed therein forwardly and rearwardly of the half mirror 69, and hub-like projections of a pair of holding members 79A and 79B are fitted in the windows 69A and 69B of the housing 78 to hold the housing 78 from the front and rear, respectively. Thus, the light beams LA1, LA2 and observation light L1 are introduced into the half mirror 69 by way of tubular introducing portions 79C and 79D formed in the windows 69A and 69B, respectively, of the housing 78.

Figure 4:
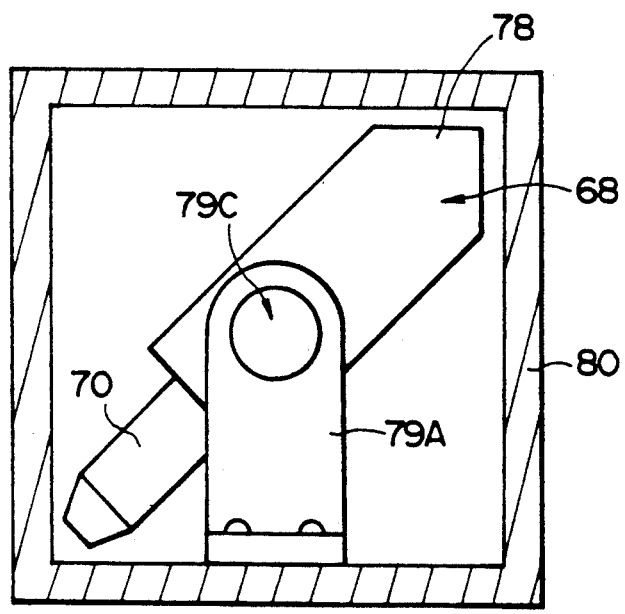
FIG. 4 is an enlarged sectional view showing an arrangement of the collimate scope of FIG. 3.

The holding members 79A and 79B are secured at base portions thereof to the casing 80 of the optical communication system body 34 as seen in FIG. 4. Thus, the entire collimate scope A can be pivoted around the optical axis of the lens 59B by slidably moving the windows 69A and 69B of the housing 78 on and with respect to the hub-like projections of the holding members 79A and 79B.

In the optical communication system 30 of the present embodiment, the casing 80 has a rectangular profile, and the collimate scope A is held in a bodily inclined condition in the direction of a diagonal line of the casing 80. In particular, when an optical communication system is constructed using such collimate scope A, it cannot be avoided that the corner cube prism 71 and the image pickup optical system 70 are projected from a lens barrel of the transmission optical system 48, and the entire outer profile is increased in size as much. Further, if the outer profile increases, then also the weight is increased and the portability is deteriorated.

Accordingly, in the optical communication system body 34, the collimate scope A is held in an inclined relationship in the direction of a diagonal line. Consequently, the collimate scope A can be accommodated making use of the internal spacing of the casing 80 effectively, and the entire outer profile of the optical communication system body 34 can be reduced in size. Accordingly, the overall weight of the optical communication system body 34 can be reduced as much, and the portability can be improved.

Further, since the collimate scope A is mounted for pivotal motion around the optical axis of the lens 59A, it can be arranged to a desired inclination in accordance with a profile of the casing 80 in which the collimate scope A is incorporated and an arrangement of parts in the casing 80. Consequently, the transmission optical system 48 can be used commonly for various optical communication systems.

Further, in this instance, a portion of the housing 78 in which the corner cube prism 71 is accommodated, that is, an upper portion of the housing 78, is formed such that a corner portion which extends in the forward and rearward direction is chamfered with a great radius in accordance with a profile of the corner cube prism 71.

Consequently, the housing 78 is reduced in overall outer profile with the collimate scope A accommodated therein and does not allow appearance of a useless spacing in the casing 80 when the collimate scope A is held in a bodily inclined relationship in a diagonal direction.

Where the collimate scope A is mounted in an inclined relationship in this manner, a display image inclined as much is displayed on the display screen 36. Therefore, the image pickup optical system 70 of the collimate scope A is mounted for turning motion around an optical axis of the image pickup optical system 70 as indicated by a double-sided arrow mark f in FIG. 3 relative to the housing 78.

Consequently, in the optical communication system body 34, the image pickup optical system 70 is turned in response to an inclination of the collimate scope A so that horizontal and vertical directions may be displayed correctly on the display screen 36.

It is to be noted that also the image pickup optical system 70 is formed such that an end thereof is reduced in thickness similarly to the accommodating portion for the corner cube prism 71 so that a useless spacing may not appear in the casing 80.

The overall profile of the optical communication system body 34 can thus be reduced in size, and the convenience in use of the optical communication system 30 can be improved as much.

Referring back to FIG. 2, the servo circuit 58 is placed into an operative condition when a controlling signal SC2 is received from the system controlling circuit 77 in response to operation of the servo switch 39 and the initializing switch 37. Thus, the servo circuit 58 corrects the irradiating position of the light beam LA1 and the polarizing plane W1 of the light beam LA1 in accordance with output signals IX1 to IY2 of the position detecting sensor 68 so that it can send out and receive information with certainty.

Figure 5:
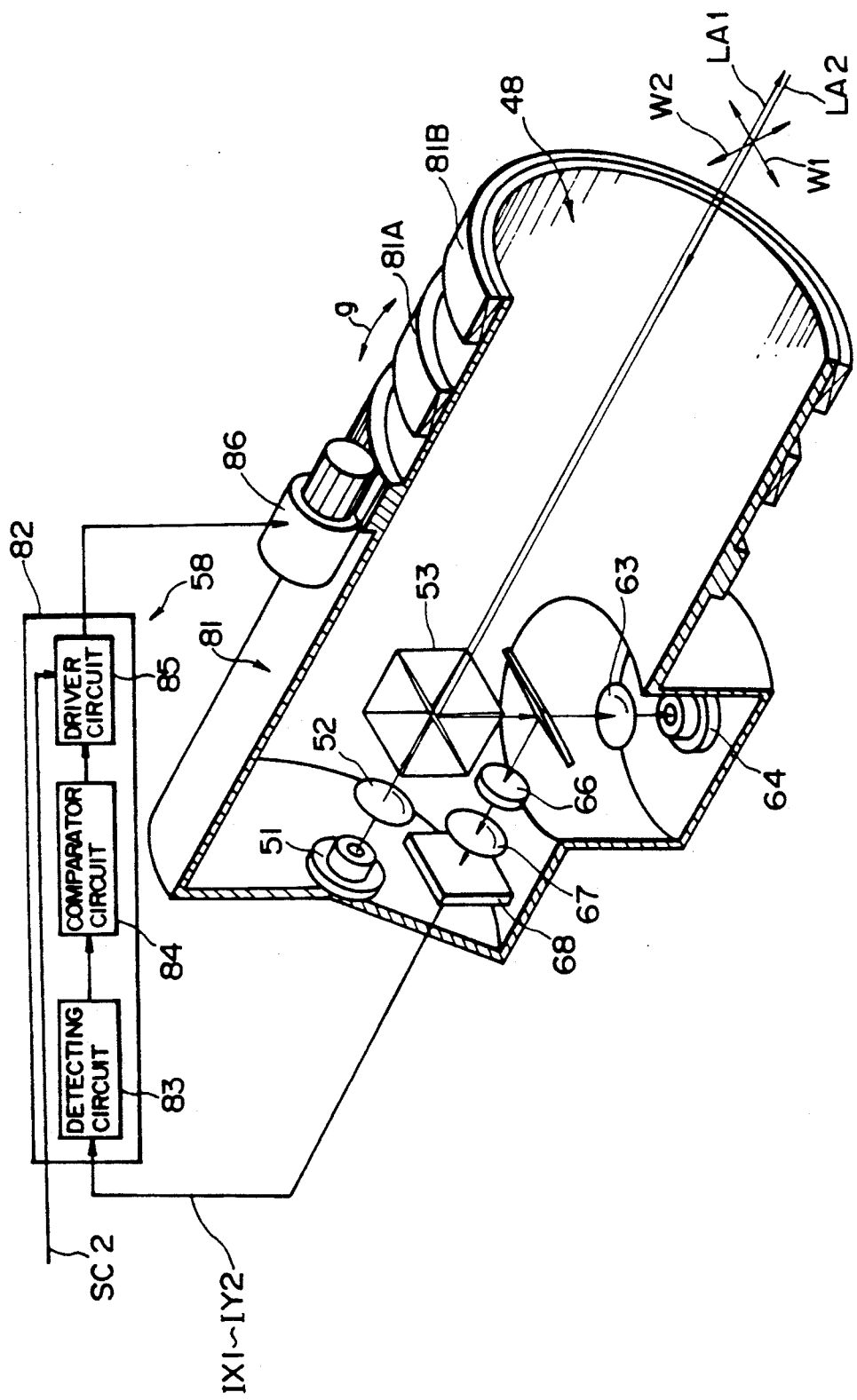
FIG. 5 is a diagrammatic representation illustrating correction of a polarization plane.

Referring to FIG. 5, the transmission optical system 48 includes an optical system from the laser diode 51 to the polarizing prism 53 and another optical system from the polarizing prism 53 to the position detecting sensor 68 and the light receiving element 64, and the two optical systems of the transmission optical system 48 are mounted integrally on a lens barrel 81. Here, the polarizing prism 53 is mounted such that the polarizing plane in a passing direction thereof may coincide with the polarizing plane W1 of the laser diode 51.

Consequently, with the optical communication system body 34, where the polarizing plane W1 of the light beam LA1 is held at the inclination of 90 degrees with accuracy with respect to the polarization plane W2 of the light beam LA2, the light beam LA2 introduced into the polarizing prism 53 is all reflected by the polarizing prism 53, and consequently, the light beam LA2 can be introduced into the position detecting sensor 68 with a highest efficiency.

The lens barrel 81 is mounted for rotation as indicated by a double-sided arrow mark g with respect to a body of the transmission optical system 48 (that is, the optical system from the mirror 56 to the lens 59B) by means of a pair of bearings 81A and 81B disposed in such a manner as to surround the lens barrel 81. Thus, with the optical communication system body 34, the polarizing plane W1 of the light beam LA1 can be adjusted with respect to the polarizing plane W2 of the light beam LA2 by rotating and securing the lens barrel 81 to and at a suitable position.

In particular, a polarizing plane servo circuit 82 of the servo circuit 58 delivers output signals IX1 to IY2 of the position detecting sensor 68 to a detecting circuit 83. The detecting circuit 83 thus adds the received output signals IX1 to IY2 to detect a light intensity of the light beam LA2 incident to the position detecting sensor 68.

A comparator circuit 84 successively fetches a result of such detection of the detecting circuit 83 for a predetermined period and produces results of comparison, thereby to detect a variation in amount of light of the light beam LA2 incident to the position detecting sensor 68.

A driving circuit 85 drives, in response to a rising edge of the controlling signal SC2 from the system controlling circuit 77, a motor 86 in accordance with a result of detection by the comparator circuit 84 to rotate the lens barrel 81 in a direction in which the amount of incident light to the position detecting sensor 68 is increased, but when the amount of such incident light is small, the direction of rotation of the motor 86 is reversed. In this manner, the optical communication system body 34 corrects the polarization plane W1 of the light beam LA1 and the polarization plane of the polarizing prism 53 in accordance with an amount of light incident to the position detecting sensor 68 so that the polarization plane W2 of the light beam LA2 and the polarization plane W1 of the light beam LA1 may be perpendicular to each other.

Accordingly, even in case the optical communication system body 34 is installed in a somewhat inclined condition, the polarization planes are automatically adjusted so that the light beam LA2 can be introduced with a high efficiency into the light receiving element 64. In this manner, an adjusting operation of the optical communication system body 34 upon installation of the optical communication system body 34 can be simplified as much.

Further, even when the entire optical communication system body 34 is vibrated such that it may be swung rightwardly and leftwardly, the polarization planes are adjusted automatically so that the light beam LA2 may be introduced with a high efficiency into the light receiving element 64.

Accordingly, even where the optical communication system 30 is carried on a ship, a vehicle, an aircraft, an artificial satellite or the like to transmit desired information, such information can be received with certainty.

Further, the optical communication system body 34 can send out a light beam LA1 having a polarization plane W1 which is inclined accurately by 90 degrees with respect to the polarization plane W2 of the light beam LA2, and consequently, the object for transmission can receive the light beam LA1 with certainty as much. Thus, information signals S1 and S2 can be sent and received with certainty.

Figure 6:
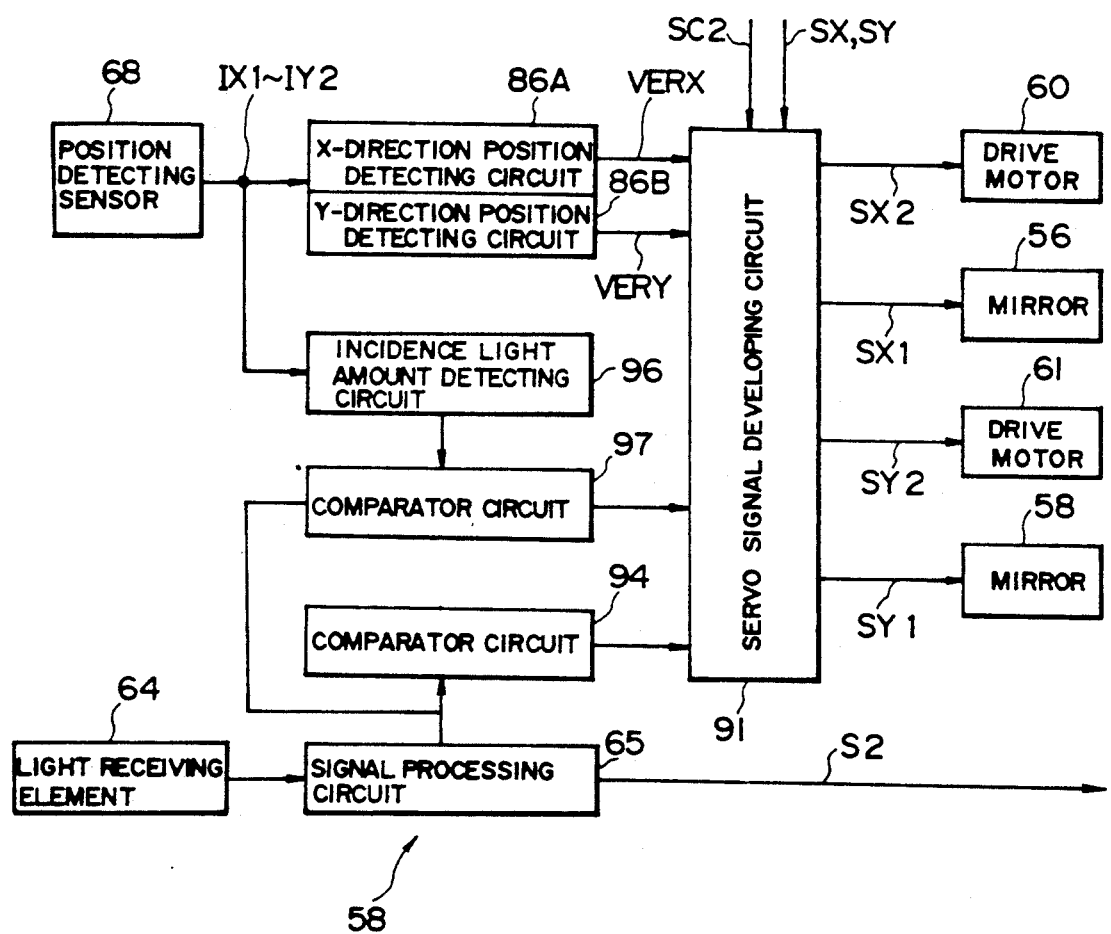
FIG. 6 is a block diagram showing a servo circuit of the optical communication system of FIG. 1.

Referring now to FIG. 6, the servo circuit 58 includes an X-direction position detecting circuit 86A and a Y-direction position detecting circuit 86B to which the output signals IX1, IX2 and IY1, IY2 of the position detecting sensor 68 are supplied, respectively, and which detect a pair of error signals VERX and VERY, respectively.

Figure 7:
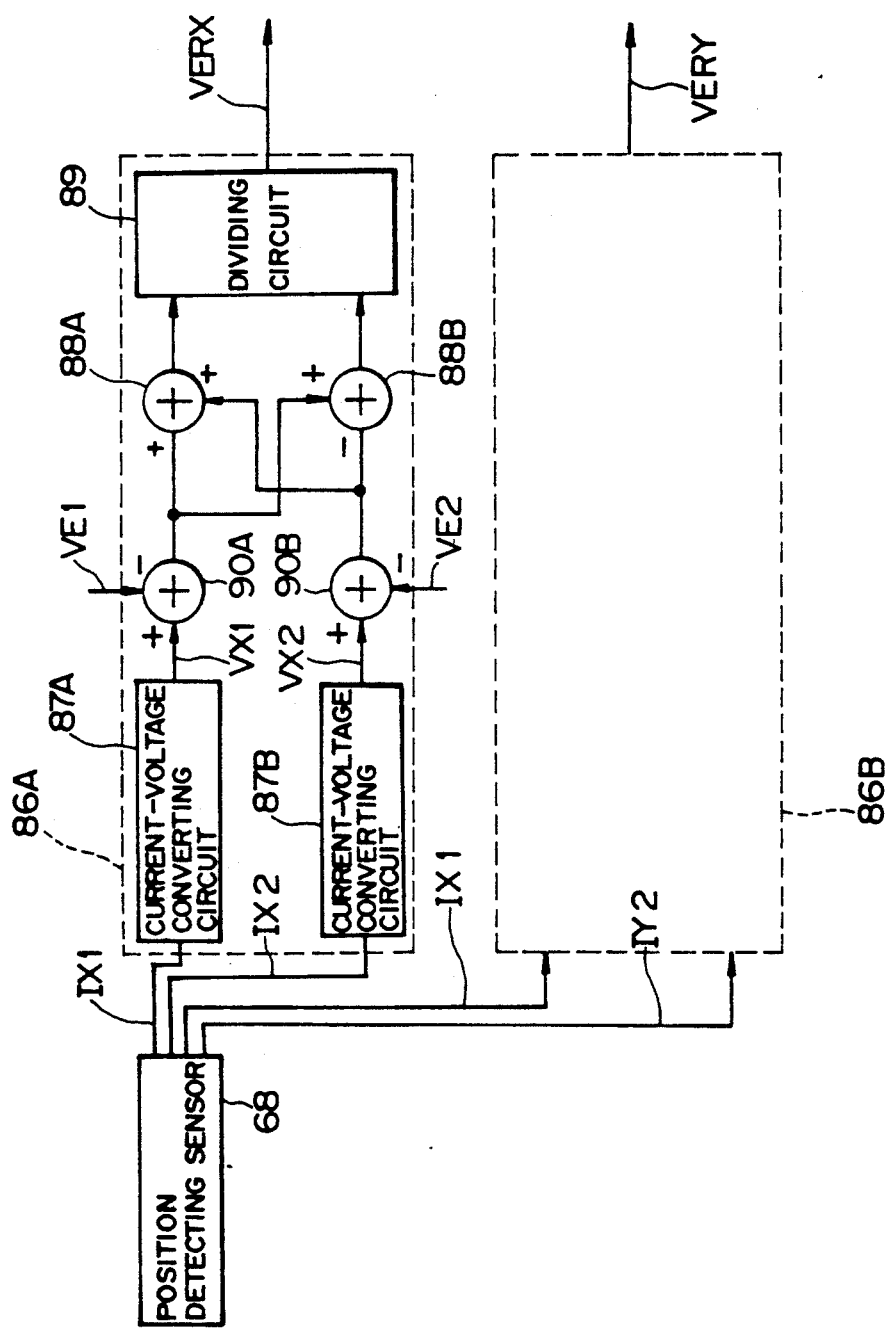
FIG. 7 is a block diagram showing a position detecting circuit of the servo circuit of FIG. 6.

Referring now to FIG. 7, in the X-direction position detector 86A, the output signals IX1 and IX2 of the position detecting sensor 68 are supplied to a pair of current to voltage converting circuits 87A and 87B, respectively. A subtracting circuit 88A and an adding circuit 88B receive output signals VX1 and VX2 outputted from the current to voltage converting circuits 87A and 87B, respectively, and output a difference signal and a sum signal of the received signals VX1 and VX2, respectively. A dividing circuit 89 divides the difference signal outputted from the subtracting circuit 88A by the sum signal outputted from the adding circuit 88B and outputs a result of such division as an error signal VERX therefrom.

Figure 8:
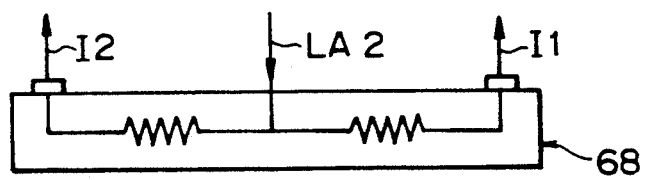
FIG. 8 is a diagrammatic view showing a position detecting sensor of the transmission optical system of FIG. 2.

Here, referring to FIG. 8, when the light beam LA2 is focused upon the light receiving face of the position detecting sensor 68 which may be formed from a photoelectric transducer film, an electric current flows in a resistor layer of the light receiving face in accordance with the focusing position of the light beam LA2 so that the ratio between output electric currents I1 and I2 of the position detecting sensor 68 is varied. From the output electric currents I1 and I2, an error signal VERX in the X direction which is represented by the following expression (1) can be obtained from the dividing circuit 89:

$$VERX = K1 \cdot \frac{IX1 - IX2}{IX1 + IX2} \quad (1)$$

where K1 is a constant. The focusing position of the light beam LA2 can be detected in this manner.

Referring back to FIG. 7, the Y-direction position detecting circuit 86B similarly executes adding and subtracting processing for the output signals IY1 and IY2 of the position detecting sensor 68 to produce an error signal VERY for the Y direction.

A displacement of the light beam LA2 can thus be detected from the error signals VERX and VERY, and the mirrors 56 and 57 and the lens 59A can be driven to move in accordance with a result of such comparison to correct the irradiating position of the light beam LA1.

By the way, since part of the light beam LA1 reflected from the lenses 59A and 59B and so forth may be introduced into the position detecting sensor 68 in addition to such light beam LA2, occurrence of measurement errors in the error signals VERX and VERY cannot be avoided.

Therefore, in the optical communication system 30 of the present embodiment, when it is installed, sending out of the light beam LA2 is interrupted and a measurement error is detected, and then in actual communication, the error signals VERX and VERY are corrected in accordance with a result of such detection of a measurement error in order to prevent possible deterioration in accuracy in measurement.

In particular, where, with regard to the X direction, output signal components of the light measuring element 68 by reflected light are placed as I1E and I2E while output signal components by the light beam LA2 are placed as I1 and I2, the output signals IX1 and IX2 are given respectively by the following expressions (2) and (3):

$$IX1 = I1 + I1E \quad (2)$$

$$IX2 = I2 + I2E \quad (3)$$

By substituting the expressions (2) and (3) into the expression (1) above, the following expression (4)

$$VERX = K1 \cdot \frac{(I1 + I1E) - (I2 + I2E)}{(I1 + I1E) + (I2 + I2E)} \quad (4)$$

is obtained. From the expression (4), it can be seen that the output signals I1E and I2E of the position detecting sensor 68 when the light beam LA2 is not received should be detected and subtracted from the output signals IX1 and IX2 of the position detecting sensor 68 obtained when the light beam LA2 is received.

To this end, the servo circuit 58 interrupts, when the optical communication system body 34 is installed, reception of the light beam LA2 and detects output voltages VE1 and VE2 of the current to voltage converting circuits 87A and 87B.

A pair of subtracting circuits 90A and 90B are interposed between the current to voltage converting circuit 87A and the subtracting circuit 88A and between the other current to voltage converting circuit 87B and the adding circuit 88B, respectively. The subtracting circuits 90A and 90B subtract the output voltages VE1 and VE2 of the current to voltage converting circuits 87A and 87B from output signals which are outputted from the current to voltage converting circuits 87A and 87B when the light beam LA1 is irradiated, thereby to correct the error signal VERX.

Actually, the laser diode 51 is driven using an APC (automatic power control) circuit to emit a light beam LA1 so that the light intensity thereof may be constant.

Consequently, the intensity of the light beam LA1 which is reflected by the transmission optical system 48 and introduced into the position detecting sensor 68 can be judged to be a substantially fixed value irrespective of presence or absence of reception of the light beam LA2.

Accordingly, if an output signal of the position detecting sensor 68 is detected in a condition wherein no light beam LA2 is received and the error signals VERX and VERY are corrected in accordance with a result of such detection as in the present embodiment, then a high degree of accuracy in measurement can be achieved.

Thus, even when the transmission distance is great and consequently the intensity of the light beam LA2 is low, very accurate error signals VERX and VERY can be obtained, and consequently, the light beam LA1 can be irradiated upon the object for transmission with certainty as much.

In particular, referring back to FIG. 6, when the controlling signal SC2 rises, a servo signal outputting circuit 91 amplifies the error signals VERX and VERY and outputs the thus amplified error signals VERX and VERY as driving signals SX2 and SY2 by way of a low-pass filter not shown therein. In accordance with such driving signals SX2 and SY2, the servo circuit 58 drives the driving motors 60 and 61 to compensate for moderate variations of the light beam irradiating position.

Further, the servo signal outputting circuit 91 produces driving signals SX1 and SY1 from the amplified error signals VERX and VERY. In this instance, the servo signal outputting circuit 91 extracts highfrequency components of the error signals VERX and VERY to produce driving signals SX1 and SX2. Then, the servo signal outputting circuit 91 drives the mirrors 56 and 57 at a high speed in accordance with such driving signals SX1 and SY1 to correct the irradiating position of the light beam LA1.

Further, in this instance, the servo signal outputting circuit 91 outputs driving signals SX1 to SY2 so that the centers of displacement of the mirrors 56 and 57 may coincide with positions at which the mirrors 56 and 57 present no displacement. Consequently, the centers of displacement of the mirrors 56 and 57 are not displaced from the centers at which they are supported.

It is to be noted that, when controlling signals SX and SY are outputted from the system controlling circuit 77 in response to operation of any of the operating elements 38A to 38D after the controlling signal SC2 falls, the servo signal outputting circuit 91 outputs driving signals SX2 and SY2 in response to the controlling signals SX and SY. Consequently, the irradiating position of the light beam LA1 can be adjusted by suitable manual operation of the operating elements 38A to 38D.

The signal processing circuit 65 detects and outputs, when it demodulates an output signal of the light receiving element 64 and outputs the demodulated signal, a signal level of the output signal. The signal processing circuit 65 thereby detects an amount of light incident to the light receiving element 64.

A comparator circuit 94 compares, for a predetermined period, a result of detection of the signal processing circuit 65 with a predetermined reference and outputs a result of such detection to the servo signal outputting circuit 91. In response to the result of detection from the comparator circuit 94, the servo signal outputting circuit 91 stops its servoing operation when the amount of light of the light beam LA2 is excessively low and consequently the accuracy of the error signals VERX and VERY is low. A possible operation in error of the entire servo circuit 58 can thus be prevented effectively.

Consequently, even if the amount of light of the light beam LA2 decreases, the irradiating position of the light beam LA1 can be maintained so that it may not be displaced to a direction quite different from the direction toward the object for transmission. Then, after the amount of light of the light beam LA2 returns to a value higher than a predetermined level, the servo circuit 58 is enabled to effect a servoing operation with certainty.

Accordingly, a re-adjusting operation of the irradiating position of the light beam LA1, which is otherwise required when the amount of light of the light beam LA2 is excessively low, can be omitted, and consequently, the convenience in use of the optical communication system 30 can be improved as much.

An incidence light amount detecting circuit 96 adds the output signals IX1 to IY2 of the position detecting sensor 68 to detect an amount of incidence light of the light beam LA2 incident to the position detecting sensor 68.

Figure 9:
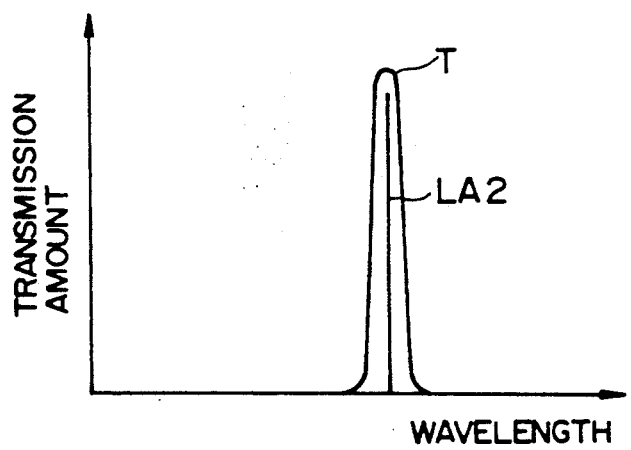
FIG. 9 is a graph showing a characteristic of a filter of the transmission optical system of FIG. 2.

A narrow-band filter 66 the pass band of which is set such that the central wavelength thereof coincides with a wavelength of the light beam LA2 as indicated at reference character T in FIG. 9 is disposed in front of the position detecting sensor 68 as seen in FIG. 5.

Another comparator circuit 97 compares a result of detection of the incidence light amount detecting circuit 96 with a result of detection of an amount of incidence light of the signal processing circuit 65 and outputs a result of such detection to the servo signal outputting circuit 91 to stop outputting of the driving signals SX1 to SY2 when the following expression (5) is met:

$$VS \leq \alpha \cdot VD \qquad (5)$$

where VS is a result of detection of the incidence light mount detecting circuit 96, VD is a result of detection of the signal processing circuit 65, and $\alpha$ is a predetermined constant.

Figure 10:
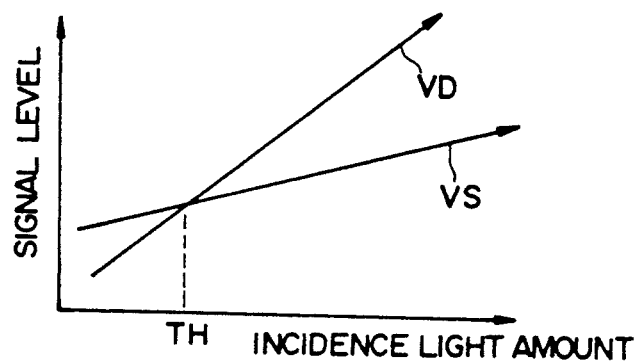
FIG. 10 is a graph showing a relationship between an amount of incidence light and a level of a signal produced from the position detecting sensor of FIG. 8.

Since the narrow-band filter 66 which passes the light beam LA2 therethrough is disposed in front of the position detecting sensor 68, if sunlight which has a wide band is introduced into the optical communication system body 34, then the amount of incidence light to the light receiving element 64 increases remarkably comparing with the amount of incidence light to the position detecting sensor 68 as seen from FIG. 10.

Accordingly, if a result of comparison between amounts of incidence light to the light receiving element 64 and the position detecting sensor 68 is obtained, then it can be judged from such result of comparison whether or not an increase in amount of incidence light is caused by sunlight.

Thus, the optical communication system 30 stops its servoing operation in accordance with the expression (5) given hereinabove, that is, stops its servoing operation when the error signals VERX and VERY are deteriorated in accuracy by admission of the sunlight.

Consequently, even if sunlight is admitted into the optical communication system 30, the optical communication system 30 maintains the irradiating position of the light beam LA1 so that it is not displaced to a direction quite different from the direction toward an object for transmission, but immediately after a condition is entered wherein sunlight is no more admitted into the optical communication system 30, the optical communication system 30 is enabled to start its servoing operation with certainty.

Accordingly, a re-adjusting operation of the irradiating position of the light beam LA1 when sunlight is admitted in can be omitted, and the convenience in use of the optical communication system 30 can be improved as much.

Referring now to FIG. 11, the mirrors 56 and 57 are supported on the body of the transmission optical system 48 each by way of a predetermined supporting member. In particular, a pivotal member 101 is supported from the opposite sides thereof for pivotal motion as indicated by a double-sided arrow mark h by means of a pair of bearing bases 100A and 100B.

The pivotal member 101 holds a mirror supporting member 102 and a damping member 103 in such a manner as to clamp them therein. The damping member 103 is formed by cutting into a predetermined shape a sheet member made of rubber or the like for absorbing vibrations.

The mirror supporting member 102 is formed from a bimorph plate as a piezo-electric element and is displaced at a free end thereof as indicated by a double-sided arrow mark i in FIG. 12 in response to a voltage applied thereacross. The free end of the mirror supporting member 102 is inserted in and adhered to a U-shaped groove of an adhesion base 104, and the mirror 56 or 57 is supported on the mirror supporting member 102 by way of the adhesion base 104.

Then, in the optical communication system body 34, driving signals SX1 and SY1 are applied to the mirror supporting member 102 to displace the mirror 56 or 57 to correct the irradiating position of the light beam LA1.

The pivotal member 101 can be fixed to the bearing bases 100A and 100B by screwing a pair of screws 105A and 105B into threaded holes not shown formed in the bearing bases 100A and 100B, respectively. The mirrors 56 and 57 can thus be adjusted individually in mounting position thereof.

Thus, by displacing the mirrors 56 and 57 using bimorph plates to correct the irradiating position of the light beam LA1, the irradiating position of the light beam LA1 can be corrected with a simple construction. Further, the responding speed can be improved comparing with an alternative arrangement which employs a galvano-mirror or the like, and information can be transmitted with certainty as much.

The damping member 103 is adhered over an entire face thereof to the mirror supporting member 102. In particular, where a bimorph plate is employed in this manner, there is a problem that it has a low resonance frequency. Particularly, where the mirror 102 is supported otherwise only by way of the bimorph plate 102 as shown in FIG. 13, a resonance point of 14 dB appears at the frequency of 88.5 Hz as seen from FIG. 14(A), and the phase varies over −190 degrees to the utmost as seen from FIG. 14(B). Therefore, the gain of the servo circuit 58 cannot be made high, and accordingly, it is difficult to assure a high follow-up speed.

On the other hand, where a sheet member 106 of rubber is adhered to the rear face of the bimorph plate 102 as shown in FIG. 15, the resonance frequency rises to 95 Hz as seen from FIG. 16(A) and the phase delay decreases to −172 degrees as seen from FIG. 16(B).

Further, if the bimorph plate 102 is adhered to the damping member 103 and they are mounted on the pivotal member 101 in such a manner as to be clamped by the latter as in the arrangement of the embodiment shown in FIG. 12, then the resonance frequency rises to 160 Hz as seen from FIG. 17(A) and the phase delay decreases to −130 degrees as seen from FIG. 17(B).

Accordingly, the frequency characteristic of the bimorph plate 102 is improved, and the servo circuit 58 is simplified in construction as much. Besides, the irradiating position of the light beam A1 can be corrected following up vibrations and so forth at a high speed, and the responding speed can be improved as much.

Referring back to FIG. 12, in the optical communication system 30 of the present embodiment, the adhesion base 104 carries the mirror 56 or 57 in a spaced relationship by a predetermined distance D from the bimorph plate 102. In particular, if the bimorph plate 102 and the mirror 56 or 57 are disposed otherwise adjacent each other, then when the bimorph plate 102 is displaced to the mirror 56 or 57 side as shown in FIG. 18, a lower end portion of the mirror 56 or 57 may possibly be contacted with the bimorph plate 102 to restrict displacement of the mirror 56 or 57. However, where the mirror 56 or 57 is carried in a spaced relationship by the predetermined distance D from the bimorph plate 102, even if the bimorph plate 102 is displaced by a great amount, it will not interfere with the mirror 56 or 57, and consequently, the irradiating position of the light beam LA1 can be corrected with certainty.

Referring back to FIG. 2, the system controlling circuit 77 is constructed from an arithmetic circuit and controls the entire optical communication system 30. In particular, when power is supplied from the power source apparatus 31 to the optical communication system body 34, the system controlling circuit 77 outputs a controlling signal SC2 to the servo circuit 58 to put the entire optical communication system body 34 into a servoing condition.

If the initializing switch 37 is operated into an on state in this condition, then the system controlling circuit 77 outputs a controlling signal SC1 to drive the motors 60 and 61 to set the lens 59A to the position at the center of movement of the same. The system controlling circuit 77 thus sets the optical communication system 30 into an initial condition for adjustment of the irradiating position of the light beam LA1 in this manner.

Then, when one of the operating elements 38A to 38D is operated into an on state, the system controlling circuit 77 outputs controlling signals SX and SY in response to the operated one of the operating elements 38A to 38D to move the lens 59A. In this instance, if the monitoring switch 41 is operated into an on state, then the system controlling circuit 77 outputs a controlling signal SC1 to cause the display screen 36 to display and changes over the magnification of the image pickup optical system 70 in response to a turning on operation of the zooming operating element 42.

Accordingly, if a user operates any of the operating elements 38A to 38D after operation of the initializing switch 37 into an on state, then the irradiating position of the optical beam LA1 is adjusted readily, and the light beam LA1 can be irradiated with certainty upon an object for transmission by operating the servo switch 39 into an on state after such adjustment.

On the other hand, if the supply of power is interrupted, a predetermined locking mechanism not shown operates so that the lens 59A is locked at a position in which it has been immediately before such interruption of supply of power.

Consequently, even if communication is interrupted and the battery is replaced, the system controlling circuit 77 can resume its communication rapidly after such replacement.

In particular, otherwise if the lens 59A is moved to set an initial condition each time power is made available, then the initializing switch 37 can be omitted and consequently the number of operating elements can be reduced as much. However, where such construction is employed, even if merely a battery is exchanged, the initializing position of the light beam LA1 is initialized unnecessarily every time, and consequently, the irradiating position of the light beam LA1 must necessarily be re-adjusted.

On the other hand, according to the optical communication system 30 of the present embodiment wherein the initializing switch 37 is provided separately and, when power is made available, the optical communication system body 34 is rendered operative so that it may perform a servoing operation, the servoing condition can be cancelled only in the case of necessity and an adjusting operation when power is made available can be omitted in accordance with the necessity. Accordingly, the convenience in use of the optical communication system 30 can be improved as much.

Consequently, in case communication is interrupted, the optical communication system body 34 can resume communication immediately by starting supply of power thereto.

When a servoing condition is established, the system controlling circuit 77 causes the light emitting element 40A to be lit. In this condition, when the light beam LA2 is focused within a predetermined scope upon the light receiving face of the position detecting sensor 68, the system controlling circuit 77 determines a servo locked condition from error signals VERX and VERY of the servo circuit 58 and causes the light emitting element 40B to be lit.

Accordingly, when the light emitting element 40A is lit but the light emitting element 40B is not lit, it can be determined that the optical communication system body 34 is in a condition wherein the irradiating position of the light beam LA1 cannot be corrected. Accordingly, a user will operate the initializing switch 37 and any of the operating elements 38A to 38D again to re-adjust the irradiating position of the light beam LA1 and then operate the servo switch 39 into an on state. As a result, the light beam LA1 can be irradiate with certainty upon an object for transmission.

Further, even if any of the operating elements 38A to 38D is operated into an on state, the system controlling circuit 77 ignores such operation unless the initializing switch 37 is operated into an on state. Consequently, an operation of a user in error can be prevented effectively.

By the way, if the amount of movement of the lens 59A is excessively great, then such an instance sometimes takes place that, while a servoing operation can follow up, for example, a large displacement toward the left side, it cannot follow up a large displacement toward the right side.

Therefore, the system controlling circuit 77 detects amounts of movement of the lens 59A by means of a pair of limit switches 108 and 109 provided on rotary shafts of the motors 60 and 61 and drives a buzzer circuit 116 when the amount of movement exceeds a predetermined value. Consequently, if the amount of movement of the lens 59A exceeds the predetermined value, the system controlling circuit 77 causes the buzzer circuit 116 to develop a buzzer sound in order to call an attention of a user.

The optical communication system 30 having such construction as described above operates in the following manner. Referring to FIG. 2, a laser beam LA1 emitted from the laser diode 51 and having a predetermined polarization plane W1 is first converted into a parallel beam of light by the lens 52 and then successively passes through the lenses 54 and 55, whereafter it is successively reflected by the mirrors 56 and 57. The light beam LA1 then partially passes through the half mirror 69 and is then sent out toward an object for transmission by way of the lenses 59A and 59B.

In this instance, the bimorph plates 102 for the mirrors 56 and 57 (FIG. 11) are displaced in accordance with driving signals SX1 and SY1 outputted from the servo circuit 58, and consequently, the mirrors 56 and 57 mounted at the ends of the bimorph plates 102 are displaced by small angles in horizontal and vertical directions as indicated by double-sided arrow marks a and b, respectively, thereby to correct the irradiating position of the light beam LA1.

On the other hand, the lens 59A is moved in an upward or downward direction and a leftward and rightward direction as indicated by double-sided arrow marks c and d by the motors 60 and 61 in accordance with driving signals SX2 and SY2 outputted from the servo circuit 58, respectively. The irradiating direction of the light beam LA1 is thus corrected roughly by such movements of the lens 59A.

Consequently, with the optical communication system body 34, even if it is vibrated by a wind or the like, the mirrors 56 and 57 and the lens 59A are moved so that the light beam LA1 can be irradiated with certainty upon the object for transmission.

On the other hand, a light beam LA2 coming from the object for transmission is received by the lens 59B and advances reversely along the optical path of the light beam LA1 so that it is introduced into the polarizing prism 53. Here, the light beam LA2 is emitted from the object for transmission such that the polarization plane W2 thereof may be perpendicular to the polarization plane W1 of the light beam LA1, and consequently, the light beam LA2 is reflected by the polarizing prism 53 and introduced into the half mirror 62. Then, the light beam LA2 partly passes through the half mirror 62 and is focused by the lens 63 upon the light receiving element 64. Thus, an information signal S2 transmitted from the object for transmission is received by the optical communication system 30.

The remaining part of the light beam LA2 introduced to the half mirror 62 is reflected by the half mirror 62 and is then focused upon the light receiving face of the position detecting sensor 68 by way of the filter 66 and the condensing lens 67. Consequently, the emitting position of the light beam LA2 with respect to the optical communication system body 34 can be detected with a high degree of accuracy.

When the light beam LA1 passes through the half mirror 69, part of it is separated by the same and is then introduced to the corner cube prism 71 past the shutter 75. The light beam LA1 is thus turned back in parallel in optical path thereof by the corner cube prism 71 and then introduced to the image pickup optical system 70 past the shutter 75 and the half mirror 69.

Thereupon, observation light L1 which advances from the background of the object for transmission toward the optical communication system 30 is received by way of the lenses 59B and 59A and then reflected by the half mirror 69 so that it is introduced into the image pickup optical system 70. Consequently, the irradiating position of the light beam LA1 can be confirmed by way of the image pickup optical system 70.

In this instance, the image pickup optical system 70 is driven by the zooming driving circuit 74 to vary its magnification. Thus, with the optical communication system body 34, the irradiating position of the light beam LA1 will first be adjusted roughly with a low magnification, and then the magnification will be successively increased to adjust the irradiating position, whereafter the servo circuit 58 will be rendered operative within the predetermined range. As a result, the irradiating position of the light beam LA1 can be adjusted readily.

Output signals IX1 to IY2 (FIGS. 6 and 7) of the position detecting sensor 68 are inputted to the X- and Y-direction position detecting circuits 86A and 86B, respectively, of the servo circuit 58, at which adding, subtracting and dividing processing thereof is performed to detect a pair of error signals VERX and VERY. In this instance, signal levels of the output signals IX1 to IY2 of the position detecting sensor 68 are first detected in a condition wherein transmission of the light beam LA2 is interrupted, and then the thus detected signal levels are subtracted from signal levels of the output signals IX1 to IY2 of the position detecting sensor 68 which are obtained during reception of the light beam LA2. Consequently, possible measurement errors of the error signals VERX and VERY can be reduced.

Accordingly, even if the transmission distance is so great that a sufficient intensity of the light beam LA2 cannot be assured, highly accurate error signals VERX and VERY can be obtained, and the light beam LA1 can be irradiated upon the object for transmission with certainty as much.

The error signals VERX and VERY are inputted to the servo signal outputting circuit 91, which drives the driving motors 60 and 61 and the mirrors 56 and 57 in response to the received error signals VERX and VERY to correct the irradiating position of the light beam LA1.

With the optical communication system 30 of the construction described above, since error signals VERX and VERY are corrected in accordance with a result of detection performed when the light beam LA2 is not received, error signals VERX and VERY having a high degree of accuracy can be obtained reducing a possible influence of reflected light. Accordingly, the light beam LA1 can be irradiated upon the object for transmission with certainty as much.

It is to be noted that, while the optical communication system 30 of the embodiment described above is constructed such that the lens 59A is moved and the bimorph plate 102 is displaced as position correcting means, the present invention is not limited to such specific arrangement, and various position detecting means can be applied widely. For example, a mirror may be driven by a motor in place of a bimorph plate.

Further, while the optical communication system 30 of the embodiment described above is constructed such that output signals of the position detecting sensor 68 are detected in a condition wherein the light beam LA2 is not received and then error signals are corrected in accordance with a result of such detection, the present invention is not limited to such specific construction, and it is only required that a result of detection performed in a condition wherein the light beam LA2 is received is corrected with another result of detection performed in another condition wherein the light beam LA2 is not received. Accordingly, various correcting methods can be applied.

Having now fully described the invention, it will be apparent to one of ordinary skill in the art that many changes and modifications can be made thereto without departing from the spirit and scope of the invention as set forth herein.

What is claimed is:

1. An optical communication system having first and second terminals remotely located from each other for transmitting therebetween a light beam carrying an information signal therein, said first terminal comprising:

means for generating a first light beam having a predetermined direction of polarization;

a beam selector for passing one of the first light beam and a second light beam coming from said second terminal therethrough and reflecting the other light beam, the second light beam having a different direction of polarization from that of the first light beam;

optical means for transmitting the first light beam to said second terminal and for receiving the second light beam from said second terminal;

means for generating an electric signal in response to the second light beam;

beam steering means for controlling the direction of the first light beam in response to the electric signal; and means for interrupting operation of said beam steering means when the electric signal has a voltage level lower than a predetermined voltage level.

2. The optical communication system according to claim 1, wherein said optical means comprises a lens and a pair of mirrors installed for movement in said first terminal to change the direction of the first light beam.

3. The optical communication system according to claim 2, wherein said beam steering means comprises first means for moving said lens in response to the electric signal to adjust the direction of the first light beam roughly, and second means for moving said mirrors in response to a high-frequency component of the electric signal to adjust the direction of said first light beam finely.

4. The optical communication system according to claim 3, wherein said mirrors are each mounted on a piezoelectric device installed in said first terminal and operated in response to the electric signal.

5. The optical communication system according to claim 1, further comprising means for displaying positions of the first and second light beams on a display monitor so that the first light beam can be directed toward said second terminal manually.

6. An optical communication system having first and second terminals remotely located from each other for transmitting therebetween a light beam carrying an information signal therein, said first terminal comprising:

means for generating a first light beam having a predetermined direction of polarization;

a beam selector for passing one of the first light beam and a second light beam coming from said second terminal and reflecting the other light beam, the second light beam having a different direction of polarization from that of the first light beam;

optical means for transmitting the first light beam to said second terminal and for receiving the second light beam from said second terminal;

means for separating the second light beam into two beams which advance in different directions;

a filter disposed on a path of one of the two beams for passing only a light beam having a predetermined frequency;

sensing means including a first sensor for sensing an output light beam of said filter and a second sensor for sensing the other of the two beams from said separating means;

beam steering means for controlling the direction of the first light beam in response to output signals of said sensing means; and means for interrupting an operation of said beam steering means in accordance with a ratio between voltage levels of output signals of said first and second sensors.

7. The optical communication system according to claim 6, further comprising means for detecting the information signal from an output signal of said second sensor.

8. The optical communication system according to claim 6, wherein said optical means comprises a lens and a pair of mirrors installed for movement in said first terminal to change the direction of the first light beam.

9. The optical communication system according to claim 8, wherein said beam steering means comprises first means for moving said lens in response to the output signals from the sensing means to adjust the direction of the first light beam roughly, and second means for moving said mirrors in response to a high-frequency component of the output signals from the sensing means to adjust the direction of said first light beam finely.

10. The optical communication system according to claim 9, wherein said mirrors are each mounted on a piezoelectric device installed in said first terminal and operated in response to the output signals from the sensing means.

11. The optical communication system according to claim 7, further comprising means for displaying positions of the first and second light beams on a display monitor so that the first light beam can be directed toward said second terminal manually.

12. An optical communication system having first and second terminals remotely located from each other for transmitting therebetween a light beam carrying an information signal therein, said first terminal comprising:

means for generating a first light beam having a predetermined direction of polarization;

optical means for transmitting the first light beam to said second terminal and for receiving a second light beam having a different direction of polarization from that of the first light beam;

means for detecting a difference between positions of the first and second light beams;

beam steering means for controlling the direction of the first light beam in response to an output signal of said detecting means;

means for generating an offset voltage in a condition wherein the second light beam is not received by said first terminal; and means for supplying the offset voltage to the output signal of said detecting means.

13. The optical communication system according to claim 12, wherein said optical means comprises a lens and a pair of mirrors installed for movement in said first terminal to change the direction of the first light beam.

14. The optical communication system according to claim 13, wherein said beam steering means comprises first means for moving said lens in response to the output signal from the detecting means to adjust the direction of the first light beam roughly, and second means for moving said mirrors in response to a high-frequency component of the output signal from the detecting means to adjust the direction of said first light beam finely.

15. The optical communication system according to claim 14, wherein said mirrors are each mounted on a bimorph member installed in said first terminal and operated in response to the output signal from the detecting means.

16. The optical communication system according to claim 12, further comprising means for displaying positions of the first and second light beams on a display monitor so that the first light beam can be directed toward said second terminal manually.

* * * * *